May 20, 1930.  J. N. A. SAUER  1,759,138
APPARATUS FOR PRODUCING ACTIVE CARBON
Original Filed July 29, 1924
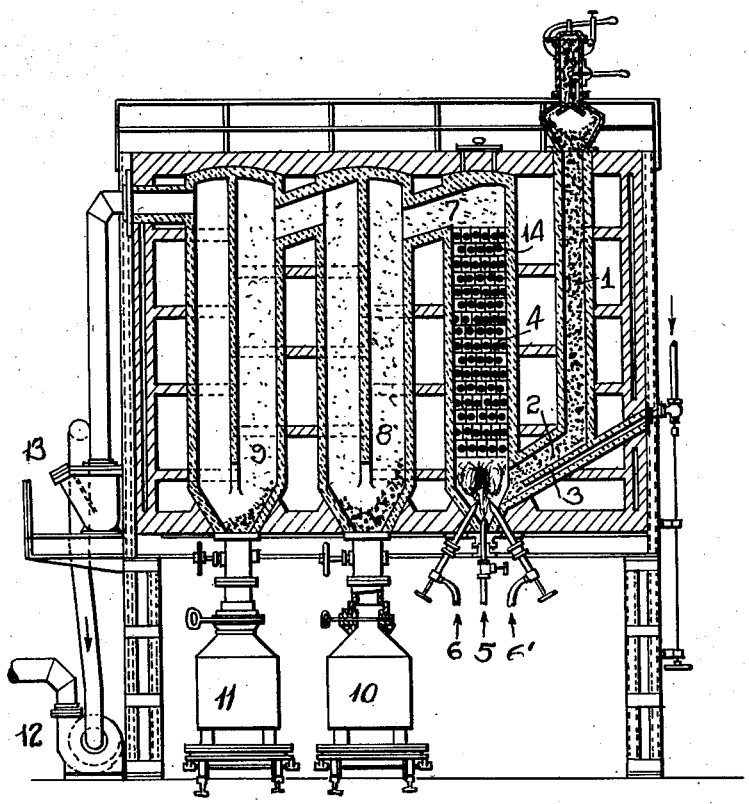
INVENTOR.
J. N. A. Sauer
BY
ATTORNEYS.

Patented May 20, 1930

1,759,138

UNITED STATES PATENT OFFICE

JOHAN NICOLAAS ADOLF SAUER, OF AMSTERDAM, NETHERLANDS; HONORE AMAND PEDRO MARIE TERVOOREN, REPRESENTATIVE OF THE ESTATE OF SAID JOHAN NICOLAAS ADOLF SAUER, DECEASED, ASSIGNOR TO NAAMLOOZE VENNOOTSCHAP ALGEMEENE NORIT MAATSCHAPPIJ, OF AMSTERDAM, NETHERLANDS, A CORPORATION OF THE NETHERLANDS

APPARATUS FOR PRODUCING ACTIVE CARBON

Original application filed July 29, 1924, Serial No. 728,923, and in Great Britain August 9, 1923. Divided and this application filed April 6, 1926. Serial No. 100,187.

In the manufacture of activated carbon, also called active absorptive, adsorptive or decolourizing carbon, it is common to cause active gases to act at high temperatures on the carbonaceous material, for example wood, charcoal, peat, lignite, coal, brown-coal or the like, sometimes after a preliminary distillation of the uncarbonized raw material. Heretofore the practice has generally been to pass the gases through the material with the latter in the form of fragments of substantial size, the carbon being subsequently reduced to the required degree of granular fineness, or to powder, by mechanical means. I have ascertained that the product obtained by this mode of procedure is a heterogenous mixture of fairly well activated carbon, moderately active carbon, and comparatively inactive carbon. This is due mainly to the fact that the requisite heat and gases are never able to fully penetrate into the comparatively large fragments of carbonaceous matter, and also to the fact that often the interior of the fragments does not attain the requisite high temperature for activation, by reason of their low heat conductivity, so that only the surface portions of such fragments of carbon are fairly well activated. If it is sought to overcome this defect by extending the treatment with heat alone, or with heat and with active gas or vapour, the result is extensive oxidation or deleterious action, such as graphitation or the like at the surface of the fragments, so that the most active part of the carbon is lost, and the useful output is reduced, the final product still being a mixture of active and more or less inactive carbon. The least activated carbon is then the hardest, and the most highly activated the softest, which is objectionable.

It has also been proposed to reduce the raw material to a more or less finely divided state before it is acted on by the heat and activating gas, but the granules of finely divided or powdered material are liable especially in vertical retorts to become packed so that the activating gases and the gases produced by the reactions in the charge cannot pass freely through the mass, and a high degree of uniformity of carbonization is not obtained.

More uniformly active carbon than that hitherto obtained by the methods of activation by heat and gases alone, has heretofore only been obtained by processes in which the raw material is first treated with solid or liquid activating chemicals, for example zinc chloride, soda lye, sulphuric acid and the like, the treatment with liquid amounting in some cases to dissolving the raw material, and the degree of uniformity being the greater, the more nearly the treatment approaches solution of the raw material. In other cases the raw material is mixed with solid or liquid activating chemicals to form a more or less intimate mechanical mixture; or inert materials such as kieselguhr, pumice stone and the like are impregnated with organic substances and then subjected to dry distillation and other activation means. But these processes are very expensive and unsatisfactory, mainly or partly because in some cases the admixed substances must subsequently be separated again. Moreover, the resultant carbon is very finely divided and soft and if the raw material had a fibrous structure that structure is destroyed, which is a disadvantage as the filtering capacity is greatly impaired. The re-activating of such soft carbon is also very difficult and even in some cases impracticable.

The object of the present invention is to provide an apparatus whereby highly uniform active, decolourizing or adsorptive carbon is obtainable by the process of activating with the aid of heat and gases alone, the method being also suitable for re-activating such carbon after use.

According to the invention the starting material, either raw or after preliminary distillation, whereby it has been reduced, say to crude charcoal of fair quality with small ash content and adequately porous, is reduced to a preferably uniform granular state, or to powder and the ground material is passed through a chamber or retort in which it is kept in a state of agitation and suspension or flotation by a blast of gas, during the activating process. By agitation I mean a condition of dispersal of the granules or particles in the gas, the ideal condition being that each particle is exposed separately to the gas, though this may not result, or may not always result, in practice.

The gas maintaining the particles in suspension may be the activating gas alone, or this gas assisted by an inert gas.

The maintenance of the more or less finely divided material in a state of flotation and continuous agitation during the activation, results in practically complete penetration of each particle of the material by the gas, producing a uniform and highly active quality of carbon, and also enables the process to be controlled and regulated much better than heretofore. The process is considerably quicker and the yield of active carbon is increased.

These advantages can practically only be attained when all particles of the carbonaceous material are kept in flotation during the whole treatment with activation gases, so that the heat and gases applied can uniformly penetrate and activate the material.

If the desired product is uniformly active carbon of a particular degree of fineness, the raw material or the partly treated material at the stage preceding activation by gas, may be reduced to that degree of fineness, which will yield at the end of the process the fineness required for the finished product.

In selecting the degree of fineness used in the process regard must be paid to the nature and constitution of the raw material, mainly to its density.

If raw material, which is not sufficiently porous, is to be made into more or less coarse granular activated carbon, we may first finely grind it, then compress it with or without an organic binding agent, and then dry distil it, either in the compressed form or after breaking it up. The activation is then performed with the material in the selected state of granulation.

In the case of very light and porous materials I have found that the granules up to about 5 mm. in diameter may be effectively treated, and can be kept in suspension by means of a blast of gas, without requiring excessive power. In the case of ordinary charcoal, granules not exceeding 2 or 3 mm. in diameter are found more convenient, and in the case of coal, I prefer to use granules below 1 mm. in thickness. In fact, generally speaking the smaller and the more uniform the particles are, the better are the results obtained, as regards activation. Pulverulent material can be treated with very good results, but suitable means must be provided for separating the powdered finished product from the retort gases. This may be done by cooling the gases and spraying them with water or steam, or by passing them through water.

It has already been stated that if the raw material has a fibrous structure the retention of this structure has marked advantages if the carbon is to be used for treating liquids. It may be said in general that the denser kinds of raw material furnish less porous carbon, better adapted for the absorption of gases or of substances in the gas phase, whereas more porous materials furnish more porous carbon better adapted for absorption from liquids, or substances in the liquid phase.

An important advantage of the process is that it allows of efficiently utilizing raw or partly distilled carbonaceous materials which with the old processes of activating by gas could either not be used at all or only in a very wasteful manner.

When using raw material which gives off substantial amounts of dry distillation products, such material may be subjected to a combined treatment, viz. to preliminary distillation before the activating stage, and such preliminary distillation may be performed with passage through the charge of practically inactive gas, or gas which is comparatively inactive; the gas quickly and thoroughly drives out the products of dry distillation and prevents the charge from becoming dense, as it would, for example, if secondary carbon or stable hydrocarbons were formed. However, this combined treatment need not be applied always.

The expulsion of products of dry distillation with the aid of inactive gas or only slightly active gas prior to activation may also be assisted by performing the dry distillation at temperatures which are higher than usual, say temperatures above 800° C., and the quality of the charge for activating purposes is thus considerably improved.

It is not essential, and in some cases it is not even desirable to effect the granulation or pulverization of the material before the preliminary distillation, or constantly to agitate the material during the preliminary process.

The designation gas, herein used, is to include vapours, such as steam and also air and mixtures of gases and vapours.

Examples of suitable activating gases are steam, preferably superheated, carbon dioxide hot gases, or gases in a state of combustion, generator gases and other gases which have an oxidizing effect at certain temperatures, and gases may be suitably admixed, for example, combustible gases, such as carbon monoxide and hydrogen with suitable amounts of air. Air by itself is not adapted to produce a high degree of activation, so if I use it I prefer to do so together with other activating gas. Gases such as chlorine and sulphur dioxide may be used to remove inorganic impurities.

In some cases it may be desirable to use several gases or gas mixtures separately, each being introduced into the apparatus at a part where there is the temperature which is best adapted for its activating function. Thus for example the true activating function of air or oxygen starts at a comparatively low temperature, say at less than 400° C., whereas for steam the temperature is higher, say 800° C., or more and for carbon dioxide higher still, up to 1200° C.

I may, however, introduce different gases or gas mixtures collectively, but operate the apparatus with different zones of temperature, suitable for the functions of the said gases respectively, so that each gas will in the main or in part perform its function in the temperature best adapted therefor.

The heating may be direct or indirect, both for the preliminary distillation, if used, and during the activating by gas. By direct heating I mean applying heat directly to the charge inside the chamber, and by indirect heating I mean heating the chamber externally. The retort or oven may be heated externally by gases generated within it, or by any other suitable means, or the heat may be generated internally, for example by burning part of the charge by introducing the proper quantity of air or oxygen, or by introducing gas in a state of combustion into the activating chamber, or by injecting hot gases, or combustion or combustible gases mixed with air.

The direct (internal) and indirect (external) heating may also be used together, and this is the method which I prefer.

The duration of the action of the activating gas, combined with the action of heat, influences both the degree of activity obtained and the yield of active carbon.

On completion of the activation by gas and heat the temperature of the charge may be raised to a higher degree, say to 1200° C. which may further improve the activity of the carbon. This may be done in an atmosphere of gas, for example carbon monoxide or chlorine. This heating after the activation by gas is finished, is desirable when activating dense organic materials, such as hard woods, coals and the like, and is not necessary and often not desirable in the case of treating light porous organic materials.

In one method of carrying my invention into practice, charcoal or other raw material, (not necessarily pre-distilled material) is introduced into a vertical retort of suitable size and length, and the active gases, with or without admixture of other gases, are injected at or near the bottom of the retort in a current of such velocity and force that the particles of material are suspended in the gaseous atmosphere and maintained in a floating state therein for a sufficient period to attain the degree of activation aimed at. Owing to the intimate contact of the material with the activating gases, and to the state of division of the material, the time needed for activation is quite short, and the product is more thoroughly and uniformly activated than in the common practice of activation by gas.

An important feature of the process according to the invention consists therein that while the solid material and the several gases (activating, heating and eventually inert gases) are continuously introduced at the lower part of the retort, the activated material is continuously drawn off from the upper part of said retort. It is remarkable that in spite of the greater true specific gravity of the activated carbon as compared with that of the raw material used, the velocity of subsidence of the activated carbon is smaller by virtue of its lower apparent specific gravity, so that it can be continuously drawn off at the higher level, while the unfinished product remains in circulation. If desired coarser lumps of material could be removed at the bottom.

The accompanying drawing illustrates by way of example a specific form of apparatus for carrying the invention into practice, but it is stated that the invention is not limited to the embodiment.

In said apparatus, the material to be activated is fed to the process through a hopper or container 1, in which preferably the material predistilled or not, may be preheated, or in some cases the container 1 may be replaced by a pre-distilling or carbonizing retort, in which raw materials, such as wood, peat, brown coal or lignite or other materials, of vegetable, animal or mineral origin may be subjected to a suitable distillation, or carbonization. In other cases it will be preferable first to carbonize the material, thereupon comminuting it and feeding it to the activation chamber in the way illustrated in the drawing. Of course, it will in some cases be possible to subject the raw material directly to the activation process without preliminary distillation.

At its lower end the container 1 is provided with a downward passage 2 leading to the activation chamber, and in said passage is an injector pipe 3 for co-operating with and controlling the feeding of the material into the activating chamber. The material may be fed mechanically if desired.

The activating chamber 4 is in the shape of a vertical retort with tapered bottom portion. The passage 2 ends in this bottom portion and several gas inlet pipes are provided therein, viz. a pipe 5 injecting superheated steam for activating purposes and pipes 6, 6', through which a combustible gas mixture or fluid fuel is fed into the retort for providing the requisite internal heating of the retort. Hot inert gases may be added to assist the suspension and supply of heat and prevent excessive oxidation. The blast of steam ejected by the pipe 5 and the other gases will be controlled as to speed and amount so that it causes the suspension of the material in the activation chamber 4 during a period of time which is sufficient for the activation aimed at (depending on the factors recited) and which is relatively short and may be only a minute or even less, the carbon particles when sufficiently activated being carried away with the escaping gas current. The mixture of activated carbon and gases is removed through the outlet 7 leading to separating chambers 8 and 9 in which the separation of active carbon and gases occurs, the settled active carbon being drawn off in containers 10 and 11, and the gases removed by suction by means of an exhauster 12 passing through a dust collecting and cleaning apparatus 13.

It will be understood that the separating apparatus is only represented diagrammatically, as it is obvious that it can be varied in many ways without departing from the spirit of the invention. There may be a plurality of activating chambers 4 either in series or parallel arrangement.

One of the features of the apparatus suitable for this invention is the provision of the activating chamber 4 with means for securing a thorough, intimate and substantial contact during a sufficient period of the activating gases with the material to be activated. Not only is it desired to cause a thorough intermingling of the material and of the gases, but moreover it is of prime importance that the carbonaceous particles on their entrance in the retort be immediately heated to the high temperature required for activation and that heat should be rapidly supplied during activation.

Because of the very bad heat conduction of the carbon, difficulties have been experienced in every activation process in causing an equal and rapid heating of the material to the activation temperature.

For the above purpose the activating chamber 4 may be provided with means for obstructing the passage of the material, causing an intimate contact and intermingling, and securing a good transmission of heat from combustion gases to the material. Surfaces may be provided for increasing the amount of heat radiated to the particles and these surfaces may be formed by the obstructing means mentioned.

To this effect the activation chamber 4 can, according to the invention, be filled up with baffle rods 14, transversely disposed in horizontal layers, in such manner that the rods of successive layers are staggered so that always the passage between two rods is deflected by a rod of the layer next above. The rods are composed of suitable heat refractory material such as silica, fireclay or magnesia and are heated to the activation temperature so that they co-operate in a very efficacious way to heat the material thoroughly and immediately.

It is in the interspaces of these rods that the activating process is mainly carried out and while the current of gases flows upwardly, the material to be activated is carried along with the gases, moving upwardly opposite to gravity. The activation progresses during this movement and a kind of sedimentation of the material occurs, as the carbon particles are carried upwards faster as they are of lower volume weight viz., the highly activated carbon particles can be made to reach the top of the activation chamber and are removed with the escaping gases.

Instead of using rods it is possible to provide a zigzag or the like path in other convenient manner, e. g. by means of lumps or quartz or the like heat-refractory materials.

Instead of internal heating by burning gases or in addition to it, liquid fuel, benzene, crude oil, petroleum, etc. or any other source of internal or external heat may be used, e. g. the rods may be replaced by pipes heated from the inside. The retort or rods may be internally or externally electrically heated.

This application is a division of my copending application Ser. No. 728,923, filed July 29, 1924, which has become Patent No. 1,641,053, August 30, 1927.

I claim:

1. An apparatus for producing active carbon from carbonaceous material comprising a substantially vertical chamber, baffling means in said chamber so disposed in relation to each other as to produce a plurality of tortuous passages in said chamber running vertically through said chamber, means to heat said chamber, means to introduce finely divided carbonaceous material and gases near the foot of said chamber, and means to draw off activated material at an upper level of said chamber.

2. An apparatus for producing active carbon from carbonaceous material comprising a chamber, staggered rods in said chamber for baffling the gases and particles of solids, means to heat said chamber, means to introduce finely divided carbonaceous material and gases near the foot of said chamber, and means to draw off activated material at an upper level of said chamber.

3. An apparatus for producing active carbon from carbonaceous material comprising a chamber, a plurality of rows of staggered baffles in said chamber, means to heat said chamber, means to introduce finely divided carbonaceous material and gases near the foot of said chamber and means to draw off activated material at an upper portion of said chamber.

4. An apparatus for producing active carbon from carbonaceous material comprising a chamber, a plurality of rows of baffles in said chamber, the baffles in one row being staggered in relation to the baffles in another row, means to heat said chamber, means to introduce finely divided carbonaceous material and gases near the foot of said chamber and means to draw off activated material at an upper portion of said chamber.

In testimony whereof I affix my signature.

JOHAN NICOLAAS ADOLF SAUER.